(12) United States Patent
Morita

(10) Patent No.: US 7,577,075 B2
(45) Date of Patent: Aug. 18, 2009

(54) OPTICAL INFORMATION RECORDING AND REPRODUCING APPARATUS, AND OPTICAL INFORMATION RECORDING AND REPRODUCING METHOD

(75) Inventor: Kuniyuki Morita, Sanda (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 11/562,549

(22) Filed: Nov. 22, 2006

(65) Prior Publication Data

US 2007/0237055 A1 Oct. 11, 2007

(30) Foreign Application Priority Data

Nov. 29, 2005 (JP) .............................. 2005-343885

(51) Int. Cl.
*G11B 7/00* (2006.01)
(52) U.S. Cl. ..................................... 369/103
(58) Field of Classification Search ................. 369/103, 369/116, 120, 121; 359/3, 22
See application file for complete search history.

(56) References Cited

U.S. PATENT DOCUMENTS

| 7,130,092 | B1 | 10/2006 | Horimai | 359/35 |
| 7,502,151 | B2 * | 3/2009 | Toishi et al. | 359/3 |
| 2002/0114027 | A1 | 8/2002 | Horimai | 359/11 |
| 2003/0063342 | A1 | 4/2003 | Horimai | 359/22 |
| 2006/0050341 | A1 | 3/2006 | Horimai | 359/22 |
| 2006/0180271 | A1 | 8/2006 | Yokoyama et al. | 156/269 |
| 2007/0103750 | A1 | 5/2007 | Horimai | 359/22 |

FOREIGN PATENT DOCUMENTS

JP 11-311936 11/1999

OTHER PUBLICATIONS

Tan, X. et al., "Holographic Memory/Measurement & Nano Control Technologies for Bolstering HVD™," Proceedings of 35$^{th}$ Meeting on Lightwave Sensing Technology, pp. 75-82 (Jun. 2005).

* cited by examiner

*Primary Examiner*—Nabil Z Hindi
(74) *Attorney, Agent, or Firm*—Fitzpatrick, Cella, Harper & Scinto

(57) ABSTRACT

An optical information recording and reproducing apparatus, comprising: an optical system for performing recording and reproduction using holography, including a first laser source, a spatial light modulator for generating an information and reference lights which share an optical axis from a beam of the first laser source an objective lens for condensing a beam from the modulator onto a recording medium, and a light detector for receiving a reflected light from the medium; and a servo optical system for tracking a beam condensed onto the medium by the objective lens, including a second laser source wherein a beam from the second laser source is condensed onto the medium via the objective lens, a servo light detector for receiving a reflected light from the medium based on the beam of the second laser source, and a controller for controlling the first and second laser sources so that light is emitted time-divisionally.

4 Claims, 5 Drawing Sheets

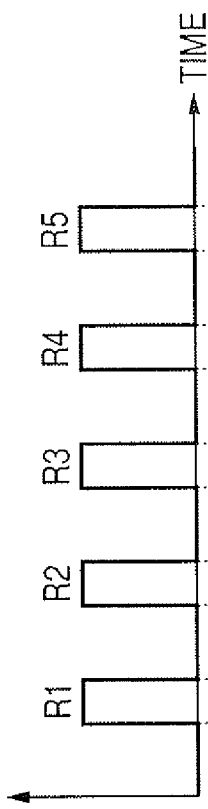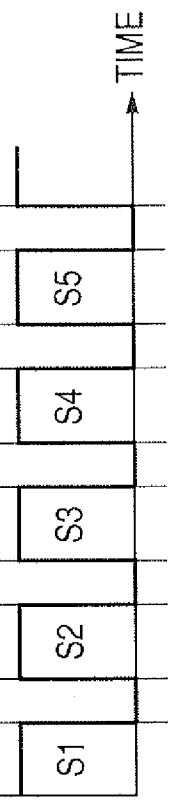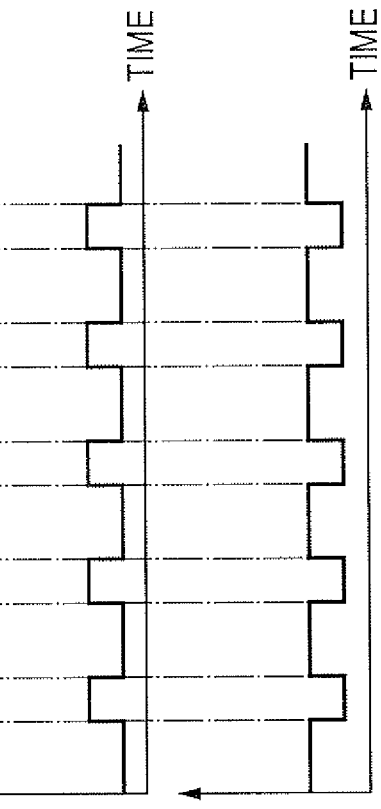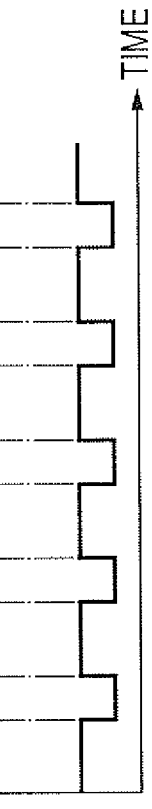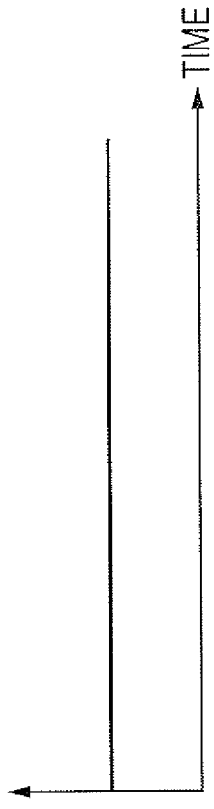

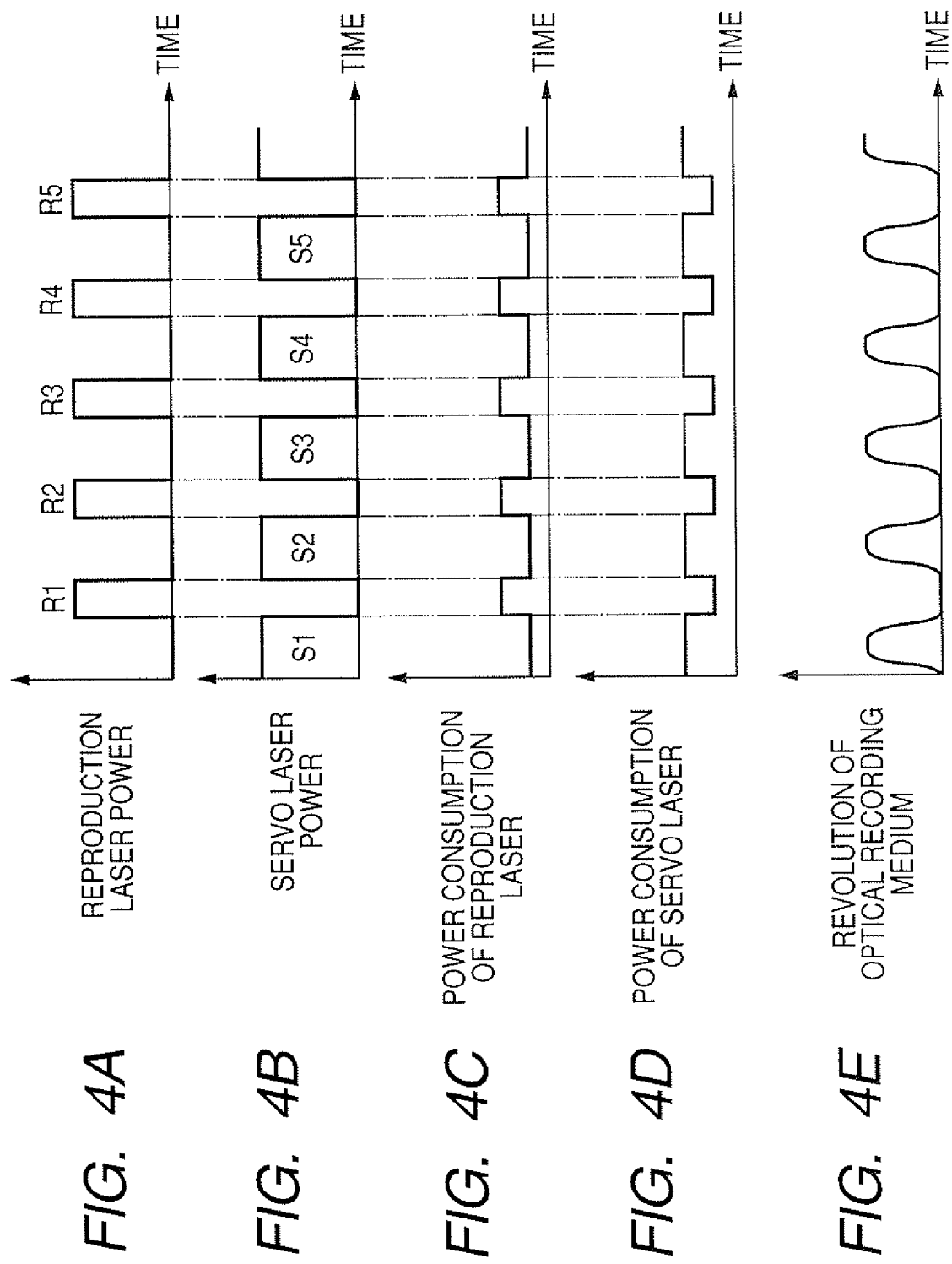

OPTICAL INFORMATION RECORDING AND REPRODUCING APPARATUS, AND OPTICAL INFORMATION RECORDING AND REPRODUCING METHOD

BACKGROUND OF THE INVENTION

1. Field of the Invention

The present invention relates to an optical information recording and reproducing apparatus and a recording and reproducing method thereof, for allowing information light and reference light to interfere with each other in an optical recording medium, and recording the pattern of a fringe thereof on an optical recording medium as information, and irradiating the optical recording medium with reference light to reproduce the information.

2. Description of the Related Art

An optical recording medium has established itself as a recording medium familiar to users due to its characteristics such as portability and non-contact property, and recently, the market for DVDs as recording media of movies and music is growing.

However, the recording capacity required in an optical recording medium is greatly increasing along with the further enhanced quality of picture and music, and a method of enhancing a recording density is actively being studied and developed. Above all, recently, a volume-type high-density optical information recording system using holography is drawing attention. In the optical information recording system using holography, information light and reference light are allowed to interfere with each other, and a three-dimensional fringe thus formed is recorded. According to this system, during reproduction, the recorded fringe is irradiated with reproduction light in the same direction as that of the reference light, whereby information is reproduced by interference. According to such a holography system, a recording medium is allowed to have information even in a thickness direction, so that a recording density can be enhanced remarkably compared with the conventional optical information recording system.

As the optical information recording system using holography, a two-beam interference system for irradiating a recording medium with information light and reference light from two separate optical paths as well as a collinear system for aligning information light and reference light coaxially and irradiating an optical information recording medium with those lights are known. Regarding the collinear system, the detail thereof is described in Tan Shochi and one other, "Holographic Memory/Measurement and Nano-control Technology Supporting HDVTM", (Proceeding of 35th Meeting on Lightwave Sensing Technology), June 2005, pp. 75-82.

Among those systems, the collinear system is advantageous in that a conventional optical system of an optical disk can be applied without a substantial change. Hitherto, there are a number of practical proposals for the optical information recording system using a hologram of a collinear system.

For example, Japanese Patent Application Laid-open No. H11-311936 discloses the use of a conventional optical information recording system that rotates a recording medium so as to attain further practicability. According to this system, as shown in FIG. 5, an optical recording medium 46 includes a layer (hereinafter, referred to as an address layer) 41 having address information and a guide groove, and a layer (hereinafter, referred to as a hologram layer) 42 for recording information using holography provided separately from the address layer 41. With such a configuration, a hologram 44 is formed in the optical recording medium 46 with recording and reproduction laser light 43 while tracking with servo laser light. Then, the hologram 44 is recorded in the hologram layer 42 in the optical recording medium 46.

Further, the information recorded in the hologram layer 42 in the optical recording medium 46 can be read with the recording and reproduction laser light 43, and the compatibility with the conventional optical information recording and reproducing apparatus is also ensured.

However, in such a configuration, the servo laser light for tracking or the like is irradiated at the same time as the laser light for recording and reproducing information.

For example, during reproduction, the servo laser light is overlapped as stray light with reproduction laser light carrying information recorded in the hologram, so that there is a problem that the quality of a signal is impaired. In the conventional optical recording medium 46 shown in FIG. 5, an attempt is made to suppress the influence by stray light by inserting a dichroic mirror layer 45 between the address layer 41 and the hologram layer 42. However, the effect thereof is limited since it is difficult to completely separate each laser light.

Further, the simultaneous irradiation of two laser light beams during recording causes a problem in terms of the power consumption of an apparatus.

SUMMARY OF THE INVENTION

An object of the present invention is to provide an optical information recording and reproducing apparatus and an optical information recording and reproducing method, in which stray light of servo laser light is prevented effectively whereby the quality of a recording and reproduction signal is not impaired in an optical information recording and reproducing system using collinear holography. A further object of the present invention is to effectively suppress the power consumption of an entire system.

In order to achieve the above-mentioned object, an optical information recording and reproducing apparatus according to the present invention enhances the quality of recording and reproduction information and the stability of servo, thereby effectively suppressing the power consumption of an entire system in recording and reproduction of collinear holography.

To be specific, there is provided an optical information recording and reproducing apparatus, comprising:

an optical system for performing recording and reproduction using holography, the optical system including a first laser light source, a spatial light modulator for generating an information light and a reference light which share an optical axis from a light beam of the first laser light source, an objective lens for condensing a light beam from the spatial light modulator onto a recording medium, and a light detector for receiving a reflected light from the recording medium; and a servo optical system for tracking the light beam condensed onto the recording medium by the objective lens, the servo optical system including a second laser light wherein a light beam from the second light source is condensed onto the recording medium via the objective lens, a servo light detector for receiving a reflected light from the recording medium based on the light beam from the second laser light source, and a controller for controlling the first laser light source and the second laser light source so that light is emitted time-divisionally.

Further features of the present invention will become apparent from the following description of exemplary embodiments with reference to the attached drawings.

BRIEF DESCRIPTION OF THE DRAWINGS

FIGS. 3A, 3B, 3C, 3D and 3E are waveform diagrams showing a condition of optical information reproduction by the optical information recording and reproducing apparatus according to Embodiment 1 of the present invention;

FIGS. 4A, 4B, 4C, 4D and 4E are waveform diagrams showing a condition of optical information reproduction by the optical information recording and reproducing apparatus according to Embodiment 2 of the present invention.

DESCRIPTION OF THE EMBODIMENTS

Hereinafter, various embodiments of an optical information recording and reproducing apparatus and an optical information recording and reproducing method according to the present invention will be described in detail with reference to the drawings.

Embodiment 1

Figure 1:
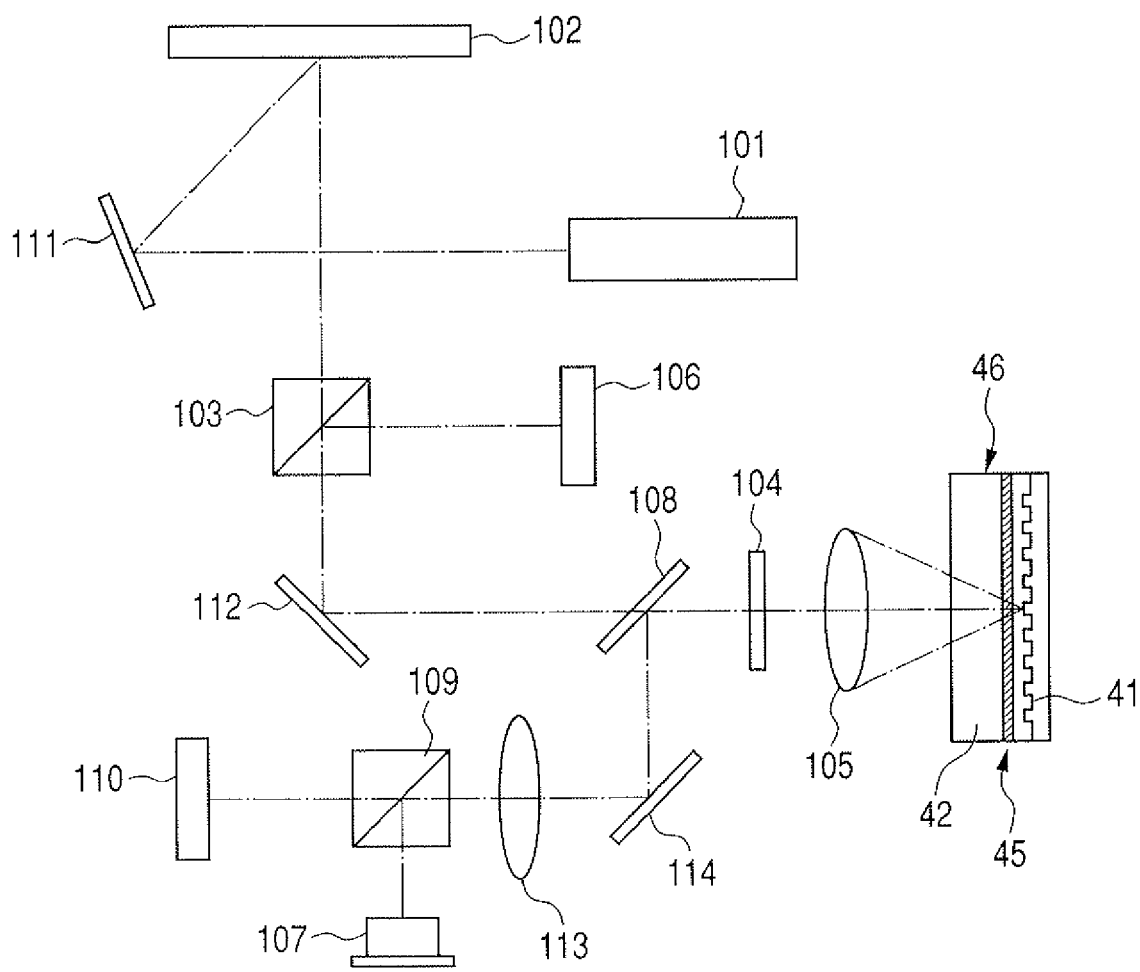
FIG. 1 is a schematic diagram of an optical system of an optical information recording and reproducing apparatus according to Embodiment 1 of the present invention.

FIG. 1 is a schematic diagram of an optical system of an optical information recording and reproducing apparatus using collinear holography according to the present embodiment.

The optical information recording and reproducing apparatus of the present embodiment shown in FIG. 1 includes a recording and reproduction laser (hereinafter, referred to as first laser source) 101 as well as a mirror 111, a spatial light modulating element (hereinafter, referred to as spatial light modulator) 102 and a polarized beam splitter (hereinafter, referred to as a PBS) 103 in an optical path on the light irradiation side of the recording and reproduction laser 101. In one optical path of the PBS 103, a light detector 106 is placed. In the other optical path of the PBS 103, a pair or relay lenses (not shown) forming a relay optical system, a mirror 112, and a dichroic mirror 108 are placed. In one optical path of the dichroic mirror 108, a quarter wavelength plate 104 and an objective lens 105 are placed. The above-mentioned optical elements constitute a recording and reproduction optical system.

Further, in the other optical path of the dichroic mirror 108, a servo laser 107 (second laser source) is placed. In an optical path on the light irradiation side of the servo laser 107, a PBS 119 is placed. In one optical path of the PBS 109, a light detector 110 is placed. In the other optical path of the PBS 109, a lens 113 and a mirror 114 are placed. The above-mentioned optical elements constitute a servo optical system.

Next, the entire operation of the optical information recording and reproducing apparatus of the present embodiment will be described. Herein, the reproduction out of recording and reproduction will be particularly described in detail.

First, during reproduction, a reproduction laser light is irradiated from the recording and reproduction laser 101. At this time, the laser light is a linearly polarized light. The reproduction laser light is caused to be incident upon the spatial light modulating element 102 via the mirror 111, and is reflected by the spatial light modulating element 102 to become a reference light. Herein, as the spatial light modulating element 102, a reflection-type element such as a digital micromirror device or deformable mirror device (DMD) or a liquid crystal on silicon (LCOS) is used.

The reference light generated by the spatial light modulating element 102 is transmitted through the PBS 103, is reflected by the mirror 112 via one of the pair of relay lenses (not shown), and is further transmitted through the quarter wavelength plate 104 via the other one of the pair of relay lenses (not shown). At this time, the transmitted light becomes a circularly polarized light, and thereafter, is condensed onto the optical recording medium 46 by the objective lens 105. The reference light irradiated to the optical recording medium 46 is focused at a position in the dichroic mirror layer 45 having a highest reflectance of the reproduction laser. In the hologram layer 42, the reference light before being reflected and the hologram with information recorded thereon interfere with each other, whereby information light containing reproduction information is generated.

The information light is reflected by the dichroic mirror layer 45, so that the information light becomes circularly polarized light in the opposite direction to that before the reflection, and becomes linearly polarized light in a direction orthogonal to that before the reflection at the quarter wavelength plate 104. Then, the information light is reflected due to the difference in polarization direction by the PBS 103 through which the reference light before being reflected is transmitted, and is caused to be incident upon the light detector 106. As the light detector 106, a complementary metal oxide semiconductor (CMOS) or a charge coupled device (CCD) can be used; however, the light detector 106 is not particularly limited thereto as long as it can convert the intensity distribution of light into an electric signal.

On the other hand, a servo laser light that is a linearly polarized light beam is irradiated from the servo laser 107 used for causing a reproduction optical system to perform tracking in a guide groove of the optical recording medium 46. The servo laser light is reflected by the PBS 109, is collimated by the lens 113, and is reflected by the mirror 114 to be incident upon the dichroic mirror 108. The dichroic mirror 108 transmits the reference light that is reproduction laser light, and reflects the servo laser light. Consequently, the servo laser light is guided into the same optical path as that of the reference light by the dichroic mirror 108, is transmitted through the quarter wavelength plate 104 and the objective lens 105, and is condensed onto the guide groove or the address layer 41 on which address information is formed, in the optical recording medium 46.

Since the light reflectance of the dichroic mirror 108 varies depending upon the difference in wavelength, the reproduction laser light and the servo laser light need to have different wavelengths. Further, in the above-mentioned optical system, the reproduction laser light (reference light) is transmitted through the dichroic mirror 108 and the servo light is reflected by the dichroic mirror 108. In contrast, the dichroic mirror 108 that reflects the reference light and transmits the servo light may be used. In this case, the optical system may be changed accordingly.

The servo light reflected which is by the address layer 41 in the optical recording medium 46 and contains servo information on address, tracking, and so on is transmitted through the objective lens 105 and the quarter wavelength plate 104, and is reflected by the dichroic mirror 108. In other words, the servo light after being reflected becomes a linear polarized light orthogonal to the light before being reflected, so that the servo light is transmitted through the PBS 109 and incident upon the light detector 110.

As the optical recording medium 46, a recording medium of a disk type, a card type, or the like may be employed. However, there is no particular limit as long as the optical recording medium 46 includes the hologram layer 42, the address layer 41, and the dichroic mirror layer 45, and can perform recording and reproduction using holography. In the present embodiment, a disk-type medium is used.

Figure 2:
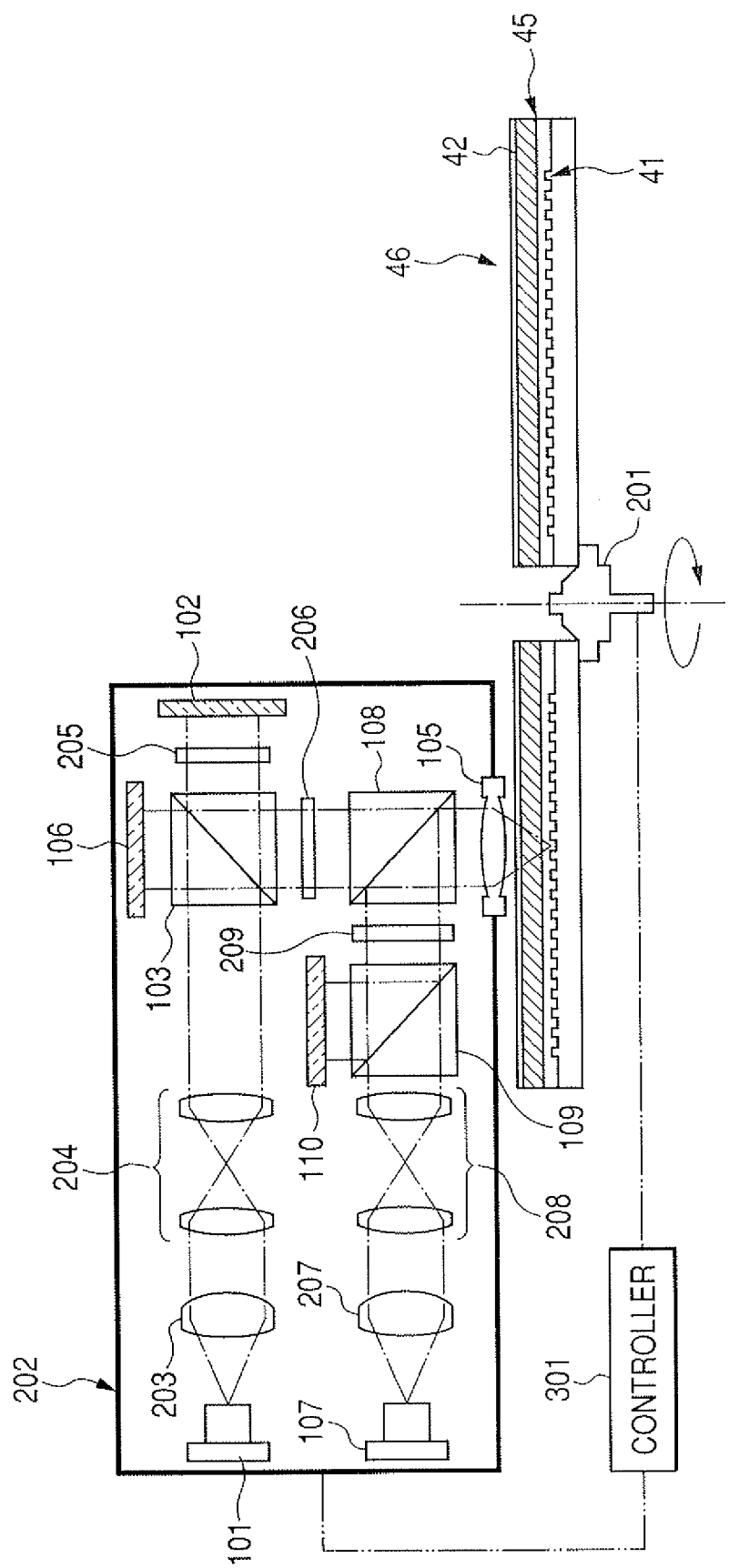
FIG. 2 is a schematic diagram showing the vicinity of an optical head of the optical information recording and reproducing apparatus according to Embodiment 1 of the present invention.
Figure 5:
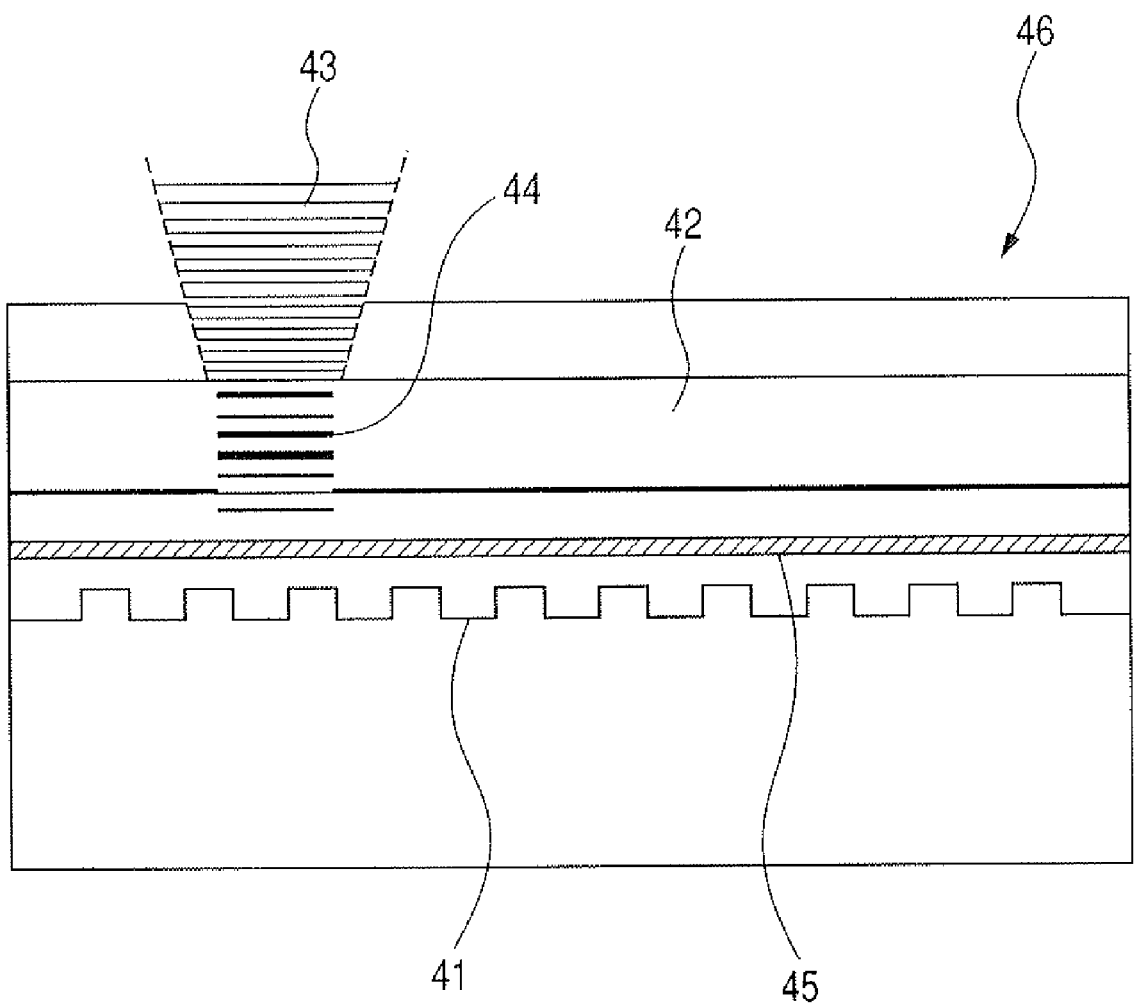
FIG. 5 is a cross-sectional view showing a configuration of a conventional optical information recording medium using collinear holography.

FIG. 2 is a schematic diagram showing the vicinity of an optical head including the above-mentioned optical system of the optical information recording and reproducing apparatus using collinear holography according to the present embodiment.

As shown in FIG. 2, the optical recording medium 46 is held and rotated by optical recording medium rotation means 201 such as a spindle motor. An optical head 202 is positioned on the side of the hologram layer 42 of the optical recording medium 46.

In the optical head 202, the above-mentioned recording and reproduction laser 101 and the servo laser 107 are provided. A reproduction light irradiated from the recording and reproduction laser 101 is collimated by a collimator lens 203, and is transmitted through a pair of relay lenses 204. The reproduction light is linearly polarized light, and is transmitted through the PBS 103 provided so as to transmit the reproduction light during irradiation.

After that, the reproduction light becomes circularly polarized light by a quarter wavelength plate 205, and is reflected by the reflection-type spatial modulating element 102. The spatial light modulating element 102 converts the reproduction light into the same intensity and phase distribution as those of the reference light during recording, and reverses the polarized light rotation direction of the reproduction light by reflection. Again, the reproduction light transmitted through the quarter wavelength plate 205 becomes linearly polarized light orthogonal to the reproduction light before being reflected, and is reflected by the PBS 103. The reproduction light reflected by the PBS 103 is converted into circularly polarized light by the quarter wavelength plate 206, and is condensed so as to be focused onto the dichroic mirror layer 45 in the optical recording medium 46 by the objective lens 105. In the hologram layer 42 in the optical recording medium 46, a conical light beam is present.

The reproduction light, which is transmitted through the hologram layer 42 in the optical recording medium 46, is reflected by the address layer 41, becomes circularly polarized light in the opposite direction and carries information, is transmitted through the PBS 103, and becomes incident upon and detected by the light detector 106 to become a reproduction signal. During recording, the recording laser light is converted into the intensity and phase distribution corresponding to the information light and the reference light in the spatial light modulating element 102, and then a fringe is formed in the hologram layer 42, whereby recording information.

On the other hand, the servo laser light irradiated from the servo laser 107 is transmitted through a collimator lens 207, a pair of relay lenses 208, the PBS 109, and a quarter wavelength plate 209 to become circularly polarized light in the same way as in the reproduction light. After that, the servo laser light is guided in the same optical path as that of the reproduction light by the dichroic mirror 108 that reflects only the light having the wavelength of the servo laser light, and is condensed so as to be focused onto the address layer 41 in the optical recording medium 46 by the objective lens 105 in the same way as in the reproduction light.

The servo laser light reflected by the address layer 41 in the optical recording medium 46 becomes reverse circularly polarized light to that before being reflected, and reflected by the dichroic mirror 108 again, and becomes linearly polarized light orthogonal to that before being reflected by the quarter wavelength plate 209. Consequently, the servo laser light is reflected by the PBS 109, and becomes incident upon and detected by the light detector 110 to become a servo signal.

Herein, in this embodiment, in order to time-divisionally irradiate the above-mentioned reproduction laser light and servo laser light, the emission timing of the recording and reproduction laser 101 and the servo laser 107 is controlled with a control signal from the controller 301. Therefore, a signal detected by each laser light is also one subjected to time division. Thus, the light detector for detecting the signal needs to detect a signal in accordance with the timing at which each laser light is irradiated. Embodiments of the method include a method of electrically dividing a serial signal obtained from the light detector in synchronization with a modulation signal of each laser, and a method of physically conduction time division of the laser light with a shutter. The method is not particularly limited, as long as a signal can be detected in accordance with the timing of each laser light.

FIGS. 3A to 3E are waveform diagrams illustrating the condition of conduction time division of the irradiation of the reproduction laser light and the servo laser light by the emission timing control with the controller 301, with time, laser power (FIGS. 3A and 3B), power consumption (FIGS. 3C and 3D), and revolution of an optical recording medium (FIG. 3E). The vertical axes in the respective figures represent reproduction laser power, servo laser power, power consumption of the reproduction laser, power consumption of the servo laser, and revolution of an optical recording medium, respectively, and the horizontal axis represents time.

FIGS. 3A to 3E show the case where the servo laser light is not irradiated only at the timing of reproduction. In this case, the controller 301 controls so that tracking is performed with respect to the address layer 41 in the optical recording medium 46 during the irradiation of the servo laser light, the reproduction laser light is irradiated and the servo laser light is not irradiated only during a predetermined time period required for reproducing information. In other words, while the servo laser light is irradiated from the servo laser 107, the reproduction laser light is not irradiated from the recording and reproduction laser 101. In contrast, while the reproduction laser light is irradiated from the recording and reproduction laser 101, the servo laser light is not irradiated from the servo laser 107.

Accordingly, while the reproduction light carrying information recorded in a hologram is incident upon the light detector 106, a part of the servo light, as a stray light, is not incident upon the light detector 106, so that the quality of a reproduction signal is prevented from being degraded.

In this embodiment, the reproduction laser light is irradiated without irradiating the servo laser light, and the time for reproducing information is set to be 500 [μsec.]. While the reproduction laser light is irradiated, and the servo laser light is not irradiated a servo such as tracking maintains a servo condition obtained by the immediately previous servo laser light.

In other words, as shown in FIGS. 3A to 3E, during a reproduction laser light irradiation time R1, the servo condition during the immediately previous servo light irradiation time S1 is maintained. After that, during a reproduction laser light irradiation time R2, the servo condition during the immediately previous servo light irradiation time S2 is maintained, and during a reproduction laser light irradiation time R3, the servo state during the immediately previous servo light irradiation time S3 is maintained. Due to the inertia caused by the rotation of the optical recording medium 46, even while the reproduction laser light is irradiated and the servo light is not irradiated, the servo is likely to become stable.

Further, in the stage of recording in this embodiment, the recording laser light is irradiated without irradiating the servo laser light, and the time for recording information is set to be the same as that in the stage of reproduction (i.e., 500 [μsec.]). Further, the immediately previous servo condition is also maintained in the same way as in the stage of reproduction. Thus, according to this embodiment, by irradiating the recording laser light and the servo laser light time-divisionally, the power consumption can be reduced.

Thus, according to this embodiment, in the optical information recording and reproduction using collinear holography, an optical recording medium is irradiated with the recording and reproduction laser light and the servo laser light time-divisionally, whereby the stray light of the servo light can be prevented, and the quality of a reproduction signal can be enhanced. Further, the power consumption can be reduced.

Embodiment 2

Next, description will be made on Embodiment 2. In the present embodiment, a card-type optical recording medium is used.

FIGS. 4A to 4E show the case where the servo laser light is not irradiated only at the reproduction timing, and the rotation of an optical recording medium is suspended for a predetermined time period during reproduction. In this case, the controller controls so that the optical recording medium moves in the rotation direction by acceleration and deceleration while the reproduction laser is not irradiated. In the optical recording medium using a hologram, a data recording region is usually provided at an interval of several μm, so that the optical recording medium moves only by the distance between the data recording regions while the reproduction light is not irradiated.

In this embodiment, the reproduction laser light is irradiated without irradiating the servo laser light, and the time for reproducing information with the rotation of the optical recording medium suspended is set to be 500 [μsec.] In this case, the optical recording medium does not move while the reproduction laser light is irradiated, so that the quality of a reproduction signal becomes better compared with that in Embodiment 1.

Further, even in the recording stage of this embodiment, the recording laser light (that is the same as the reproduction laser light) was irradiated without irradiating the servo laser light, and the time for recording information with the rotation of the optical recording medium stopped was set to be the same as that in the reproduction stage (i.e., 500 [μsec.]).

In the recording stage, a fringe is recorded in the hologram layer. However, in order to expose a photosensitive resin of a certain volume to light, more energy is required compared with that in the reproduction stage. In the case of this embodiment, light exposure can be performed with respect to a predetermined portion by suspending the optical recording medium, so that the quality of information to be recorded becomes better compared with that of Embodiment 1 in which the optical recording medium continues to move. Further, since a predetermined portion can be exposed to light, an inexpensive semiconductor laser with a low power like that for a DVD or a CD can be used as a recording and reproduction light source, and hence the cost of the recording and reproducing apparatus can also be decreased.

In each of the above-mentioned embodiments, the spatial light modulator of a reflection type such as a DMD or an LCOS is used. However, the present invention is not limited thereto, and for example, a spatial light modulator of a transmission type such as a transmission-type liquid crystal may be used. In this case, the mirror 111 is not required.

Further, in each of the above embodiments, as control means for allowing the recording and reproduction laser and the servo laser to emit light time-divisionally, the controller in the apparatus is illustrated. However, the present invention is not limited thereto. A controller with any configuration is applicable as long as it has a control circuit capable of realizing the function comparable to the above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-343885, filed Nov. 29, 2005, which is hereby incorporated by reference herein in its entirety.

What is claimed is:

1. An optical information recording and reproducing apparatus, comprising:
an optical system for performing recording and reproduction using holography, the optical system including a first laser light source, a spatial light modulator for generating an information light and a reference light which share an optical axis from a light beam of the first laser light source, an objective lens for condensing a light beam from the spatial light modulator onto a recording medium, and a light detector for receiving a reflected light from the recording medium; and
a servo optical system for tracking the light beam condensed onto the recording medium by the objective lens, the servo optical system including a second laser light source wherein a light beam from the second laser light source is condensed onto the recording medium via the objective lens, a servo light detector for receiving a reflected light from the recording medium based on the light beam from the second laser light source, and a controller for controlling the first laser light source and the second laser light source so that light is emitted time-divisionally.

2. An optical information recording and reproducing apparatus according to claim 1, wherein the controller causes the first laser light source and the second laser source to perform pulse emission during information reproduction and causes the second laser light source to suspend emission during the first laser light is emitted.

3. An optical information recording and reproducing apparatus according to claim 1, wherein the controller causes the first laser light source and the second laser source to perform pulse emission during information recording, and causes the second laser light source to suspend emission during the first laser light is emitted.

4. An optical information recording and reproducing apparatus according to claim 1, wherein the controller causes the first laser light source to suspend emission during movement of the recording medium and causes the second laser light source to emit light.

* * * * *